US009626167B2

(12) United States Patent
Bonanno et al.

(10) Patent No.: US 9,626,167 B2
(45) Date of Patent: Apr. 18, 2017

(54) USING BUILD HISTORY INFORMATION TO OPTIMIZE A SOFTWARE BUILD PROCESS

(71) Applicant: International Business Machines Corporation, Armonk, NY (US)

(72) Inventors: James M. Bonanno, Ocean Isle Beach, NC (US); Ronald P. Doyle, Raleigh, NC (US); Michael L. Fraenkel, Pittsboro, NC (US); Aaron J. Tarter, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 469 days.

(21) Appl. No.: 14/012,619

(22) Filed: Aug. 28, 2013

(65) Prior Publication Data

US 2014/0033186 A1   Jan. 30, 2014

Related U.S. Application Data

(63) Continuation of application No. 12/195,241, filed on Aug. 20, 2008, now abandoned.

(51) Int. Cl.
*G06F 9/45* (2006.01)
*G06F 9/44* (2006.01)

(52) U.S. Cl.
CPC .............. *G06F 8/443* (2013.01); *G06F 8/433* (2013.01); *G06F 8/71* (2013.01)

(58) Field of Classification Search
CPC . G06F 8/443; G06F 8/71; G06F 8/433; G06F 8/445; G06F 8/441; G06F 8/4441
USPC ........................................................... 717/156
See application file for complete search history.

(56) References Cited

U.S. PATENT DOCUMENTS

| 4,809,170 | A | 2/1989 | Leblang et al. |
|---|---|---|---|
| 5,758,160 | A | 5/1998 | McInerney et al. |
| 6,918,111 | B1 | 7/2005 | Damron et al. |
| 7,251,584 | B1 | 7/2007 | Perazolo et al. |
| 2004/0194060 | A1* | 9/2004 | Ousterhout et al. .......... 717/120 |
| 2006/0085858 | A1* | 4/2006 | Noel et al. ...................... 726/25 |
| 2008/0256392 | A1 | 10/2008 | Garland et al. |
| 2009/0113396 | A1* | 4/2009 | Rosen et al. .................. 717/127 |

* cited by examiner

*Primary Examiner* — Viva Miller
(74) *Attorney, Agent, or Firm* — Cuenot, Forsythe & Kim, LLC

(57) ABSTRACT

Methods and systems for optimizing a build order of component source modules comprises creating a dependency graph based on dependency information. Historical build information associated with previous build failures is then used to calculate relative failure factors for paths of the dependency graph; and the relative failure factors are used to determine an order of traversal of the dependency graph during a build process in which component binary modules are built from the component source modules.

21 Claims, 4 Drawing Sheets

USING BUILD HISTORY INFORMATION TO OPTIMIZE A SOFTWARE BUILD PROCESS

CROSS-REFERENCE TO RELATED APPLICATIONS

This application is a continuation of U.S. application Ser. No. 12/195,241, filed on Aug. 20, 2008.

BACKGROUND OF THE INVENTION

There are hosting systems in which developers may upload their source code modules for storage in a source code management (SCM) repository. Examples of such SCM repositories include CVS™ and Subversion™. The SCM repository, which contains source code modules, is used to build binary libraries and application modules. The binary libraries and application modules can be stored in a binary repository. Examples of such binary repositories include Redhat Network™, Yum™, Maven™, and CPAN™ for example.

The source code modules are compiled and linked into the binary modules during one or more build processes, and the source code modules have defined dependencies that may determine the possible orders in which the build processes can execute. There may be multiple independent build processes that need to run at any given time, and the build processes may need to decide among multiple possible paths of execution. The dependency information becomes particularly important as the number of libraries/applications that are being built is very large, e.g. over 100 libraries, and where the libraries are rapidly changing. In this case, a great deal of processing power is necessary to keep up with the changes and for efficiency, only the source code modules that are changed should be the rebuilt.

Depending on the nature of build components, such as the source code modules, and their usefulness as independent components, it might be more efficient to perform the build in such a way as to find failing source code modules first, which is referred to as "failure first", or to find failing source code modules last, which is referred to as "failure last". If the components only have usefulness as a whole, it is better to find failures as soon as possible so they can be fixed and the process can restart. If the components have usefulness independently, or the build process can start at a node in a dependency graph where the process failed last, then it is more efficient to find failure last, because more components will be published before a failure occurs. Unfortunately, it may not be apparent how to optimize the build order of the component source modules for failure first or failure last based on the dependency information alone.

BRIEF SUMMARY OF THE INVENTION

Methods and systems for optimizing a build order of component source modules comprises creating a dependency graph based on dependency information. Historical build information associated with previous build failures is then used to calculate relative failure factors for paths of the dependency graph; and the relative failure factors are used to determine an order of traversal of the dependency graph during a build process in which component binary modules are built from the component source modules.

DETAILED DESCRIPTION OF THE INVENTION

The present invention relates to using build history information to optimize a software build process. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The exemplary embodiment provides for use of historical information associated with previous build failures to determine a build order of component source code modules for failure first or failure last when dependency information alone does not force the determination.

Figure 1:
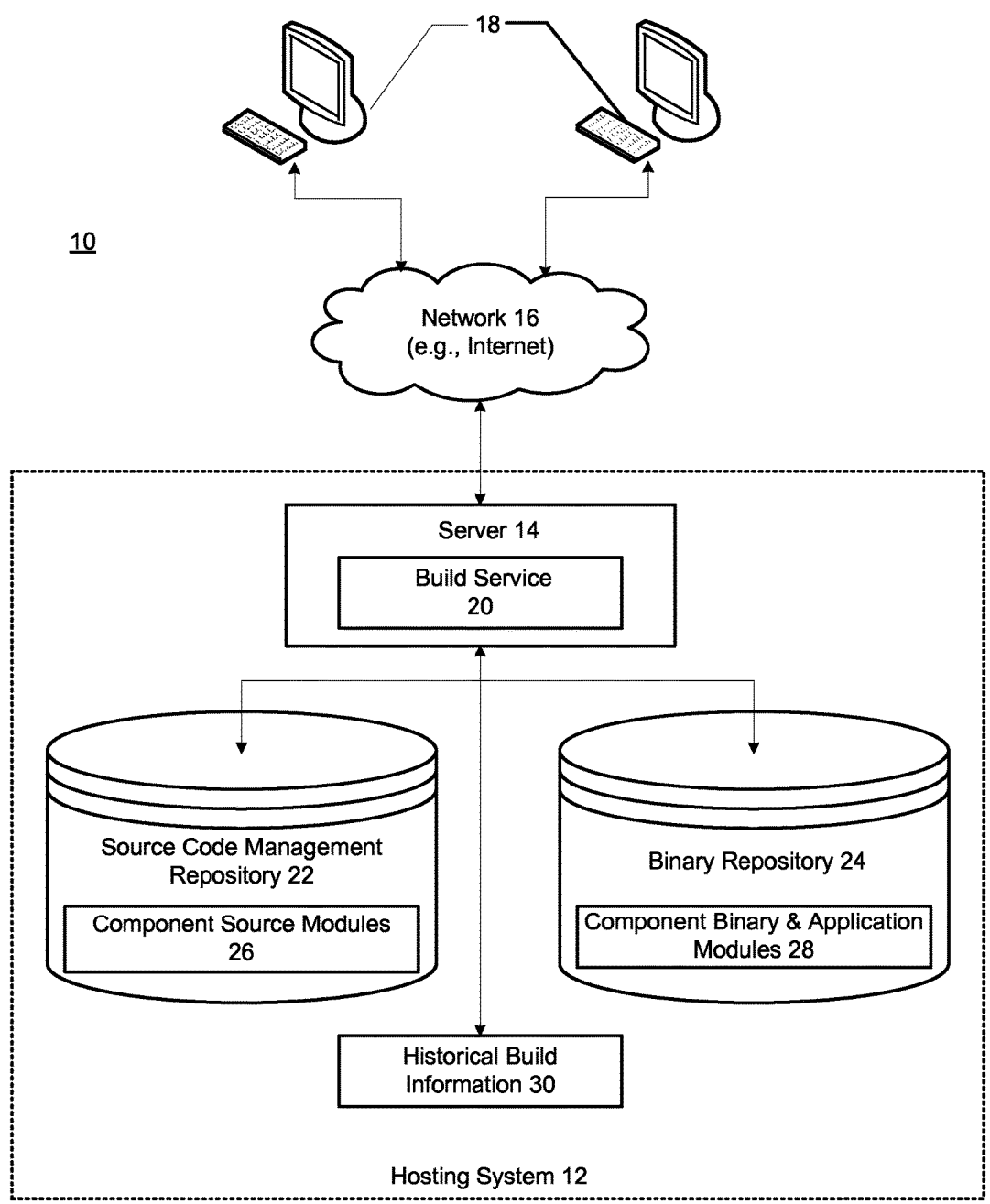
FIG. 1 is a block diagram illustrating an exemplary network system environment in which one embodiment of the present invention may be implemented for optimizing a build order of component source modules.

FIG. 1 is a block diagram illustrating an exemplary network system environment in which one embodiment of the present invention may be implemented for optimizing a build order of component source modules. The network system environment 10 may include a hosting system 12 comprising one or more servers 14 coupled to a network 16 that provides a hosting service for a plurality of users of client computers 18. The hosting system 12 may include a build service 20 executing on the server 14, a source code management repository 22 and a binary repository 24. The source code management repository 22 stores a library of component source modules 26 (i.e., source code), and the binary repository 24 stores a library of component binary and application modules 28 (i.e., executable code). The build service 20 performs a build process on the source modules 26 that compiles and links the source modules 26 into the component binary and application modules 28.

Developers of the component source modules 26 upload their component source modules 26 from the client computers 18 to the server 14. The build service 20 may store the submitted component source modules 26 in the source code management repository 22 within a directory structure. Once the component source modules 26 are stored in the source code management repository 22, the developers may make changes to the component source modules 26 and re-run the build. At least a portion of the component source modules 26 are dependent upon other component source modules 26 and such dependency information may be stored in dependency files (not shown). Each library in the source code management repository 22 may define its set of dependencies (e.g., using OSGI (Open Services Gateway initiative); a Java Archive (JAR) with an optional manifest file located in a path MANIFEST.MF; Ivy: ivy.xml; or maven: pom.xml). Typically, the order of the dependencies dictates the order of the build process. However, in some cases, the dependencies do not dictate the order of the build process.

According to the exemplary embodiment, the hosting system 12 may also include historical build information 30, which is used to optimize the build order of the component source modules 26 when the dependency information alone is insufficient to determine the build order, as explained below.

Although the build service 20 is shown as one component, the build process may be implemented as multiple build processes, and the functionality of the build service 20 may be implemented with a greater number of components and run on the same or on multiple servers 14.

Figure 2:
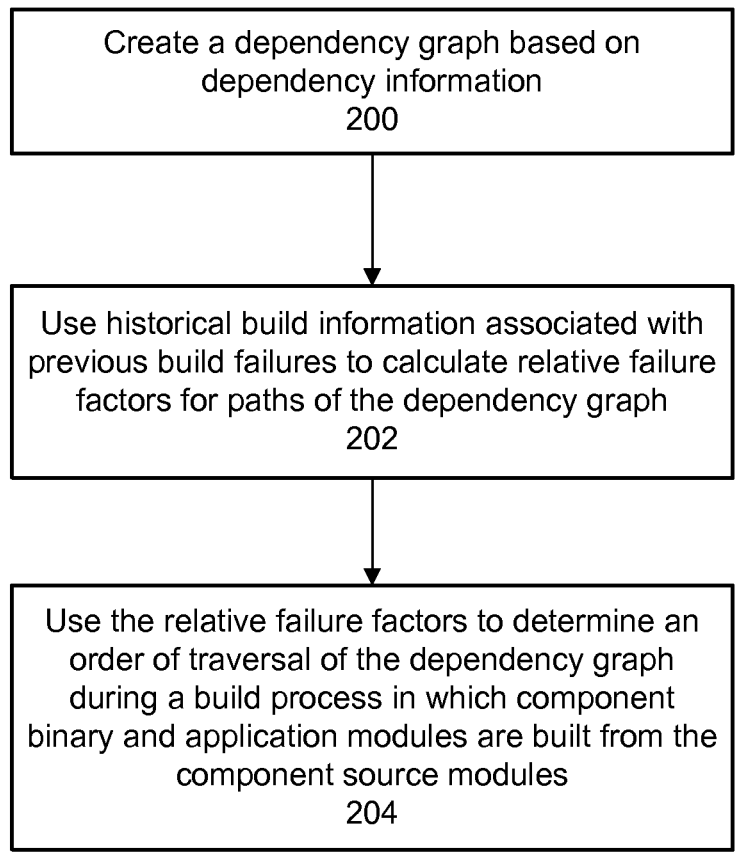
FIG. 2 is a flow diagram illustrating a process for optimizing a build order of component source modules.

FIG. 2 is a flow diagram illustrating a process for optimizing a build order of component source modules 26. In the exemplary embodiment, the process is performed by the build service 20, with or without the aid of additional applications. The process may begin by creating a dependency graph (block 200). In one embodiment, a global reverse dependency graph is created by merging dependency files associated with the component source modules 26 and reversing the directions of the edges in the dependency graph.

In one embodiment the process may begin by polling the source code management repository 22 for any changes in dependency information in the component source modules 26. In one embodiment, both the source code management repository 22 and/or the binary repository 24 may be polled for changes. In one embodiment, polling may be initiated manually whereby the polling is initiated by a developer via a client computer 18. In another embodiment, polling may be initiated automatically. Automatic polling may be triggered by an expiration of a configured time interval. If no changes are detected, then the polling may be rescheduled for a later time. A continuous integration build server, such as Cruise Control™ or Anthill™ can be used to poll the source code management repository 22 and/or the binary repository 24 for changes. Alternatively, a time-based scheduling service, such as "cron" of UNIX-like operating systems, could be used. In response to detecting changes in the dependency information, the dependency graph may be created based on the dependency information.

The historical build information 30 associated with previous build failures is used to calculate relative failure factors for paths of the dependency graph (block 202). The relative failure factors of the paths are then used to determine an order of traversal of the dependency graph during a build process in which component binary and application modules 28 are built from the component source modules 26 (block 204).

According to the exemplary embodiment, the historical build information 30 may include the following:

a history of which respective component source modules 26 have failed most often in the past as a percentage of the total attempts to build the respective component source modules;

a history of the developer's contributions to build failures as a percentage of developer's total contributions;

a total number of file changes since a last successful build.

In one embodiment, when a component source module 26 is used in a build, historical build data is recorded for the source module and the developer of the source module in the historical build information 30. The list of historical build information may be readily changed and expanded. For example, information such as time of day may be stored to determine whether network access or other outside variables are affecting the build process. These pieces of information can be used to show a relative likelihood of failure.

Figure 3A:
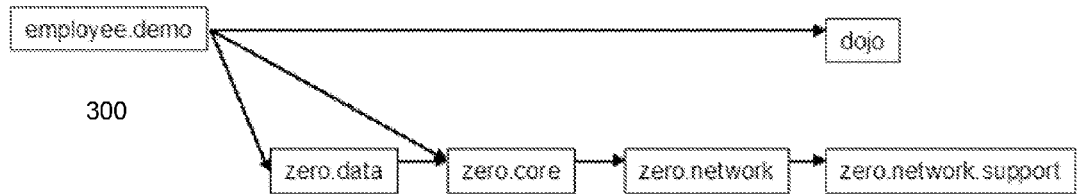
FIGS. 3A-3D are diagrams illustrating an example creation of a global reverse dependency graph.

FIGS. 3A-3D are diagrams illustrating an example creation of a global reverse dependency graph. A global reverse dependency graph is created from a merging of the dependencies from two modules, employee.demo and zero.services.rating, and then a reversal of the directions of the edges of the merged graph. FIG. 3A shows a dependency graph 300 of the dependencies for the employee.demo module. An example xml version of the employee.demo module could be:

```
employee.demo/confg/ivy.xml:
<ivy-module version="1.3">
    <info module="employee.demo" organisation="zero" packagingType="unknown" revision="1.0.0">
        <license name="type of license" url="http://license.page"/>
        <ivyauthor name="AuthorsName" url="http://authors.home.page"/>
        <description homepage="http://module.description.page"/>
    </info>
    <publications>
        <artifact name="employee.demo" org="zero" type="zip"/>
    </publications>
    <dependencies>
        <dependency name="zero.core" org="zero" rev="1.0+"/>
        <dependency name="dojo" org="dojo" rev="0.4.3"/>
        <dependency name="zero.data" org="zero" rev="1.0+"/>
    </dependencies>
</ivy-module>
```

Figure 3B:
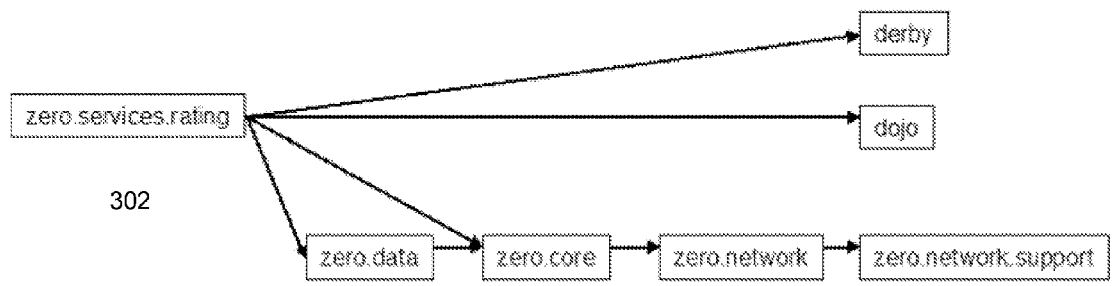

FIG. 3B shows a dependency graph 302 of the dependencies for the zero.services.rating model. An example xml version of the employee.demo module could be:

```
zero.services.rating/confg/ivy.xml:
<?xml version="1.0" encoding="UTF-8"?>
<ivy-module version="1.3">
    <info module="zero.services.rating" organisation="zero" packagingType="shared" packagingVersion="1.0.0" revision="1.0.0">
        <license name="IBM" url="http://www.ibm.com"/>
        <ivyauthor name="Project Zero" url="http://www.projectzero.org"/>
        <description homepage="http://www.projectzero.org"/>
    </info>
    <publications>
        <artifact name="zero.services.rating" org="zero" type="zip"/>
    </publications>
    <dependencies>
        <dependency name="zero.core" org="zero" rev="1.0+"/>
        <dependency name="zero.data" org="zero" rev="1.0+"/>
        <dependency name="dojo" org="dojo" rev="0.4.3"/>
        <dependency name="derby" org="org.apache.derby" rev="10.2.2+"/>
    </dependencies>
</ivy-module>
```

Figure 3C:
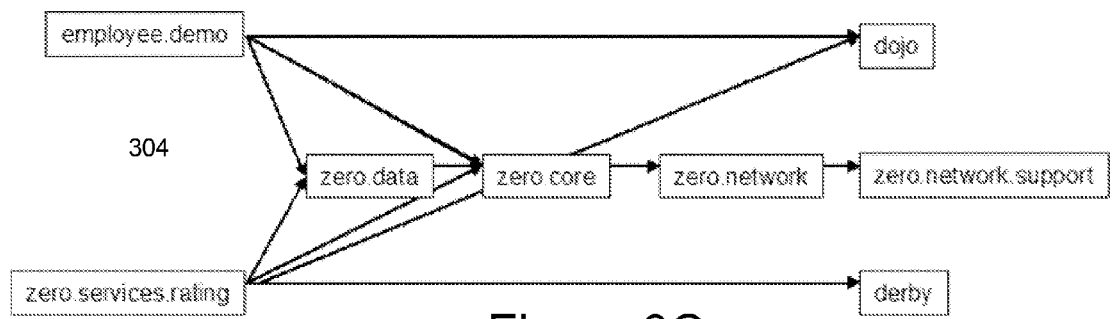
Figure 3D:
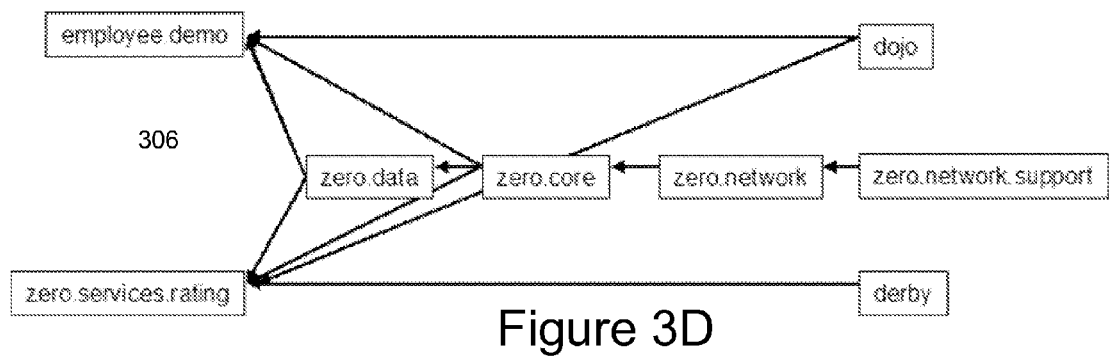

FIG. 3C shows a merged global dependency graph 304 for the modules employee.demo and zero.services.rating; and FIG. 3D shows a global reverse dependency graph 306, which is created by reversing directions of the edges of the merged global dependency graph 304.

Figure 4:
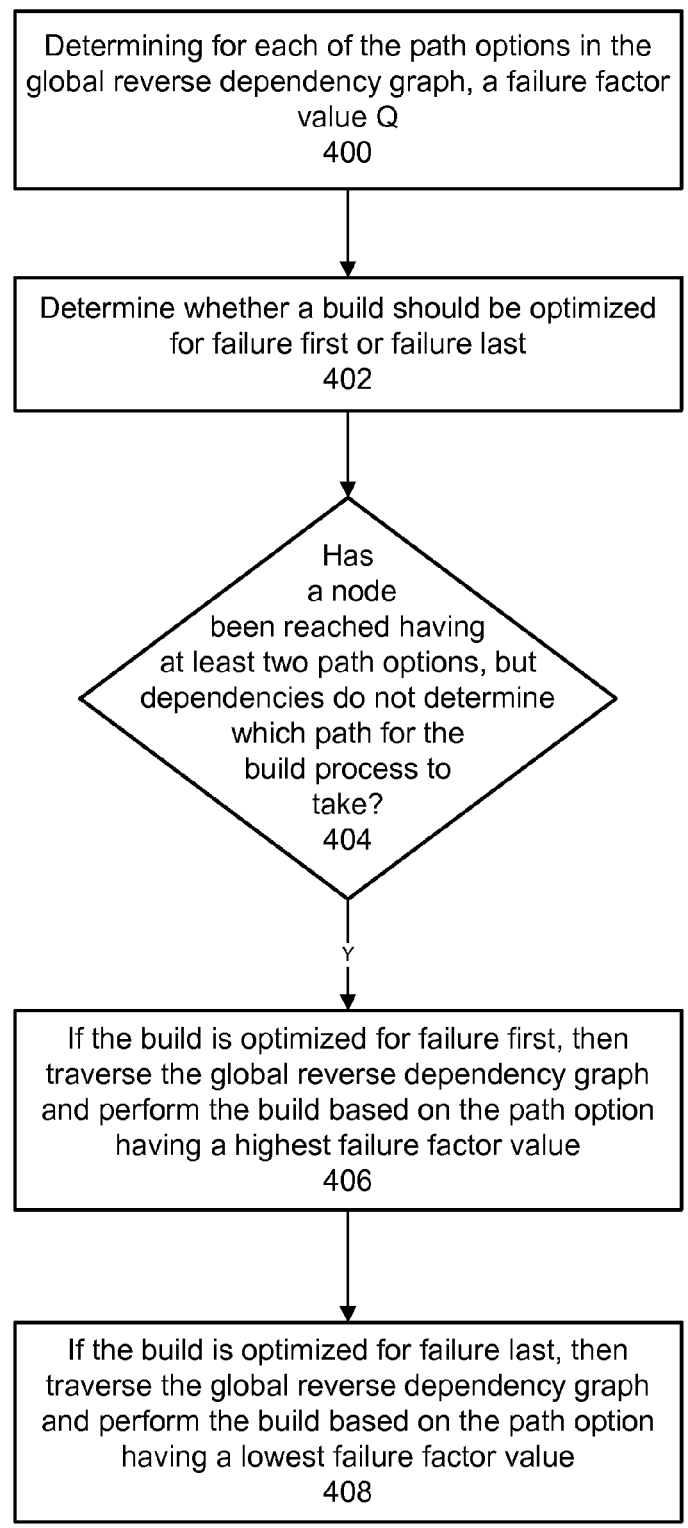
FIG. 4 is a flow diagram illustrating a process for calculating relative failure factors for paths of the dependency graph.

FIG. 4 is a flow diagram illustrating a process for calculating relative failure factors for paths of the dependency graph, described in block 204 of FIG. 2, in further detail. The process may begin by determining for each of the path options in the global reverse dependency graph 306, a failure factor value Q (block 400). According to one exemplary embodiment, Q may be defined as $$Q = P_c * \left( \frac{\sum_{i=0}^{n} (Pd_i * Fd_i)}{\sum_{i=0}^{n} Fd_i} \right)$$

where $P_c$ represents a percentage of past failures for a particular component source module;

$Pd_i$ represents the percentage of past failure for a particular developer ($d_i$) who committed code to the particular component source module; and $Fd_i$ represents a number of files committed by the particular developer ($d_i$).

After the failure factor values have been calculated, it is determined whether a build should be optimized for failure first or failure last (block 402). As stated above, failure first refers to performing the build in such a way as to find failing component source modules 26 first, while failure last refers to performing the build in such a way as to find a failing component source modules 26 last. The determination of optimizing a build based on failure first or failure last may be based upon user input.

When traversing the global reverse dependency graph 306 during the build process, it is determined whether a node has been reached having at least two path options, but dependencies do not determine which path for the build process to take (block 404). If so, and if the build is optimized for failure first, then the build service 20 traverses the global reverse dependency graph 306 and performs the build based on the path options having a highest failure factor value (block 406). If the build is optimized for failure last, then the build service 20 traverses the global reverse dependency graph 306 and performs the build based on the path options having a lowest failure factor value (block 408).

During the actual build process, the build service 20 may check the source code management repository 22 to determine whether the component source modules 26 have changed (e.g., using a 'svn info' command in the case of a subversion repository), and, whether the changes require compilation or just runtime testing (i.e., skip the building phase). In one embodiment, the component source modules 26 may need recompiling if the compiled source file types for the component have changed, or if any direct compilation dependencies have changed. If any other changes have occurred within a component source module 26, then the component source module 26 only needs to be republished (e.g., config files, scripts). Following the example described in FIGS. 3A-3D and the example XML, the zero.services.rating, zero.data, zero.core, dojo, and derby modules are direct dependencies since they are referenced directly by the ivy.xml module. On the other hand, zero.network and zero.network.support are transitive dependencies.

To determine the ordered list of component source modules 26 that need to be compiled, the build service 20 traverses the global reverse dependency graph 306. For each node in the global reverse dependency graph 306 the build service 20 may build the node if there was a change that requires it, i.e., compiled source file types changed, or a compiled source file types of a directly connected node changed. Using the example global reverse dependency graph 306 above, if a change to a compiled source file type was detected in zero.network.support, then the build service 20 would need to build zero.network.support and zero.network since there could have been API changes in zero.network.support that could affect the compilation of zero.network.

In one embodiment, the build service 20 may publish the build results to a temporary working repository that is used by the hosting system 12 until all changes have been fully verified by completing all of the above defined phases/steps which ends in publication. Builds may resolve against a chain of binary repositories, where the temporary binary repository has greater precedence than the publicly available binary repository 24. This may allow recently built libraries to be resolved against before the libraries are published.

After the component binary and application modules 28 have been built, the build service 20 may test the component binary and application modules 28 based on change information and the dependency graph. The set of component binary and application modules 28 that will need to be tested will be equal to or greater than the set of component binary and application modules 28 that needed to be built during the build phase, since the set includes a full set of transitive dependencies and because the changes that require testing might not be included in those that require building. Continuing with the example described in FIGS. 3A-3D, if zero.network.support had any change, then any connected node (either transitively or directly) would need to be tested. This would include zero.network, zero.core, zero.data, employee.demo, and zero.services.rating.

After testing, the build service 20 may publish new libraries of component binary and application modules 28 from a temporary working repository to the binary repository 24, and clean the temporary working repository.

A method and system for optimizing a build order of component source module for failure first or failure last has been disclosed. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for optimizing a build order of component source modules, comprising:
   creating a dependency graph based on dependency information;
   calculating, using historical build information associated with previous build failures, relative failure factors for paths of the dependency graph; and
   determining, using the relative failure factors, an order of traversal of the dependency graph during a build process, wherein
   component binary modules are built from the component source modules during the build process, and
   the historical build information includes at least one of:
      a history of which respective component source modules have failed most often as a percentage of total attempts to build the respective component source modules,
      a history of a developer's contributions to build failures as a percentage of a total contribution of the developer, and
      a total number of file changes since a last successful build.

2. The method of claim 1, wherein
the dependency graph is a global reverse dependency graph.

3. The method of claim 2, wherein
the global reverse dependency graph is created by reversing directions of edges of a merged global dependency graph.

4. The method of claim 2, wherein
the relative failure factors are calculated by determining a failure factor value for each of a plurality of path options in the global reverse dependency graph.

5. The method of claim 4, wherein
upon the build processor being optimized for failure last, the build process is performed by traversing the global reverse dependency graph using path options having lowest failure factor values.

6. The method of claim 4, wherein
the failure factor value is designated as Q and defined as:

$$Q = P_c * \frac{\sum_{i=0}^{n}(Pd_i * Fd_i)}{\sum_{i=0}^{n} Fd_i}$$

$P_c$ represents a percentage of past failures for a particular component source module;
$Pd_i$ represents a percentage of past failure for a particular developer ($d_i$) who committed code to the particular component source module; and
$Fd_i$ represents a number of files committed by the particular developer ($d_i$).

7. A computer hardware system configured to optimize a build order of component source modules, comprising:
   at least one processor, wherein the at least one processor is configured to initiate and/or perform:
      creating a dependency graph based on dependency information;
      calculating, using historical build information associated with previous build failures, relative failure factors for paths of the dependency graph; and
      determining, using the relative failure factors, an order of traversal of the dependency graph during a build process, wherein
   component binary modules are built from the component source modules during the build process, and
   the historical build information includes at least one of:
      a history of which respective component source modules have failed most often as a percentage of total attempts to build the respective component source modules,
      a history of a developer's contributions to build failures as a percentage of a total contribution of the developer, and
      a total number of file changes since a last successful build.

8. The system of claim 7, wherein
the dependency graph is a global reverse dependency graph.

9. The system of claim 8, wherein
the global reverse dependency graph is created by reversing directions of edges of a merged global dependency graph.

10. The system of claim 8, wherein
the relative failure factors are calculated by determining a failure factor value for each of a plurality of path options in the global reverse dependency graph.

11. The system of claim 10, wherein
upon the build processor being optimized for failure last, the build process is performed by traversing the global reverse dependency graph using path options having lowest failure factor values.

12. The system of claim 10, wherein
the failure factor value is designated as Q and defined as:

$$Q = P_c * \frac{\sum_{i=0}^{n}(Pd_i * Fd_i)}{\sum_{i=0}^{n} Fd_i}$$

$P_c$ represents a percentage of past failures for a particular component source module;
$Pd_i$ represents a percentage of past failure for a particular developer ($d_i$) who committed code to the particular component source module; and
$Fd_i$ represents a number of files committed by the particular developer ($d_i$).

13. A computer program product, comprising:
   a computer memory having stored therein computer usable program instructions for optimizing a build order of component source modules,
   the computer usable program instructions, which when executed on a computer hardware system causes the computer hardware system to perform:
      creating a dependency graph based on dependency information;

calculating, using historical build information associated with previous build failures, relative failure factors for paths of the dependency graph; and determining, using the relative failure factors, an order of traversal of the dependency graph during a build process, wherein component binary modules are built from the component source modules during the build process, and the historical build information includes at least one of:
- a history of which respective component source modules have failed most often as a percentage of total attempts to build the respective component source modules,
- a history of a developer's contributions to build failures as a percentage of a total contribution of the developer, and
- a total number of file changes since a last successful build.

14. The computer program product of claim 13, wherein the dependency graph is a global reverse dependency graph.

15. The computer program product of claim 14, wherein the global reverse dependency graph is created by reversing directions of edges of a merged global dependency graph.

16. The computer program product of claim 14, wherein the relative failure factors are calculated by determining a failure factor value for each of a plurality of path options in the global reverse dependency graph.

17. The computer program product of claim 16, wherein upon the build processor being optimized for failure last, the build process is performed by traversing the global reverse dependency graph using path options having lowest failure factor values.

18. The computer program product of claim 16, wherein the failure factor value is designated as Q and defined as:

$$Q = P_c * \frac{\sum_{i=0}^{n}(Pd_i * Fd_i)}{\sum_{i=0}^{n} Fd_i}$$

$P_c$ represents a percentage of past failures for a particular component source module;

$Pd_i$ represents a percentage of past failure for a particular developer ($d_i$) who committed code to the particular component source module; and $Fd_i$ represents a number of files committed by the particular developer ($d_i$).

19. The method of claim 4, wherein
upon the build processor being optimized for failure first, the build process is performed:
by traversing the global reverse dependency graph, and
using the plurality of path options having a highest failure factor value.

20. The system of claim 10, wherein
upon the build processor being optimized for failure first, the build process is performed:
by traversing the global reverse dependency graph, and
using the plurality of path options having a highest failure factor value.

21. The computer program product of claim 16, wherein
upon the build processor being optimized for failure first, the build process is performed:
by traversing the global reverse dependency graph, and
using the plurality of path options having a highest failure factor value.

* * * * *